United States Patent
Li

(10) Patent No.: US 9,101,014 B2
(45) Date of Patent: Aug. 4, 2015

(54) LED CONTROLLING CIRCUIT WITH HIGH POWER FACTOR AND AN LED LIGHTING DEVICE

(71) Applicant: Shenzhen Sunmoon Microelectronics Co., Ltd., Nanshan Shenzhen, Guangdong (CN)

(72) Inventor: Zhaohua Li, Guangdong (CN)

(73) Assignee: SHENHEN SUNMOON MICROELECTRONICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/350,113

(22) PCT Filed: Aug. 12, 2013

(86) PCT No.: PCT/CN2013/081248
§ 371 (c)(1),
(2) Date: Apr. 7, 2014

(87) PCT Pub. No.: WO2014/029279
PCT Pub. Date: Feb. 27, 2014

(65) Prior Publication Data
US 2014/0239824 A1    Aug. 28, 2014

(51) Int. Cl.
*H05B 37/02* (2006.01)
*H05B 33/08* (2006.01)

(52) U.S. Cl.
CPC .......... *H05B 33/0812* (2013.01); *H05B 33/083* (2013.01); *Y02B 20/345* (2013.01)

(58) Field of Classification Search
USPC ....................... 315/224, 291, 307, 308, 185 R
See application file for complete search history.

(56) References Cited

U.S. PATENT DOCUMENTS

| 7,550,934 | B1 * | 6/2009 | Deng et al. ................. 315/308 |
| 2007/0114951 | A1 * | 5/2007 | Tsen et al. .................. 315/291 |
| 2008/0203946 | A1 * | 8/2008 | Ito et al. ..................... 315/307 |

(Continued)

FOREIGN PATENT DOCUMENTS

| CN | 202258258 | 5/2012 |
| CN | 202374525 | 8/2012 |

(Continued)

OTHER PUBLICATIONS

International Search Report filed in PCT/CN2013/081248 mailed Nov. 21, 2013.

*Primary Examiner* — David H Vu
(74) *Attorney, Agent, or Firm* — Rankin, Hill & Clark LLP

(57) ABSTRACT

The present invention is suitable for an LED controlling field, and provides an LED controlling circuit with high power factor and an LED lighting device. In the present invention, by using an LED current controlling circuit with high power factor comprising a plurality of output current controlling modules, a resistor Re and a reference voltage generating module, the LED groups is driven accordingly in a piecewise manner to be on and a current flows through the LED groups according to the input voltage of the LED strip, without sampling the input voltage of the LED strip by a sampling circuit and without increasing the number of high cost component, which increase the utilization of the LED, the power factor of the whole LED controlling circuit and the efficiency of the system, thereby solving the problem of low power factor and low efficiency system existing in the prior art.

6 Claims, 6 Drawing Sheets

(56) References Cited

U.S. PATENT DOCUMENTS

2010/0289424 A1 11/2010 Chang et al.
2013/0026933 A1 1/2013 Gao

FOREIGN PATENT DOCUMENTS

| CN | 102858062 | 1/2013 |
| CN | 202759647 | 2/2013 |

* cited by examiner

LED CONTROLLING CIRCUIT WITH HIGH POWER FACTOR AND AN LED LIGHTING DEVICE

TECHNICAL FIELD

The present invention belongs to an LED controlling field, and more particularly, relates to an LED controlling circuit with high power factor and an LED lighting device.

BACKGROUND

At present, as a new type of light source, the LED is widely used in various fields due to having the advantages of high brightness, low energy consumption and long life. As LED has a constant forward conduction voltage, only when a total forward conduction voltage of a LED strip is reached, the LED strip can light. To ensure that the LED strip can work steadily, a constant current control on the LED strip is needed, and the traditional linear constant current controlling method for the LED strip is achieved by connecting a linear constant current controlling circuit between the output terminal of the rectifier bridge and the input terminal of the LED strip (as shown in FIG. 1), or between the output terminal of the LED strip and the ground (as shown in FIG. 2). And in the case of using the mains power supply, when the linear constant current source is used to control the LED strip, only when the main input voltage rectified by the rectifier bridge voltage is greater than the conduction voltage of the LED strip, a current will flow through the LED strip; when the voltage rectified by the rectifier bridge voltage is less than the conduction voltage of the LED strip, no current will flow through the LED strip, which lowers the utilization and power factor of the LED.

In order to solve the problem existing in the traditional linear constant current controlling method for the LED strip, two solutions are provided in the prior art. The first method comprises connecting a high voltage electrolytic capacitor to the output terminal of the rectifier bridge, and filtering an input sine wave voltage into a DC voltage larger than the conduction voltage of the LED strip through the electrolytic capacitor, such that the LED in the LED strip can be continuously on and a current flows through the LED in the whole clock cycles. This can improve the utilization rate of the LED, but reduces the power factor and at the same time increase the cost of the system. In addition, due to the short service life of the electrolytic capacitor, the service life of the power supply is reduced. The second way comprises decreasing the amount of the LEDs in the LED strip to reduce the total forward conduction voltage of the LED strip, such that the time when the LED in the LED strip can be continuously on and current flows through the LED in each clock cycle increases. However, the solution decreases the utilization rate of the input voltage, and makes the driving circuit of LED strip suffer from a large voltage, increases the power consumption of the driving circuit, and reduces the efficiency of the system.

In conclusion, the existing technology has the problem of low power factor and low efficiency system.

SUMMARY

The present invention is aimed at providing an LED controlling circuit with high power factor to solve the problem of low power factor and low efficiency system existing in the prior art.

The present invention is achieved by an LED controlling circuit with high power factor, connected with a LED strip which comprises a plurality of LED groups connected in series of which each comprises a number of LEDs connected in series, in parallel or in series-parallel. The LED controlling circuit comprises:

a plurality of output current controlling modules, a resistor Re and a reference voltage generating module;

the number of the plurality of output current controlling modules is equal to the number of the plurality of LED groups, each of the output current controlling modules comprises a current input terminal, a reference voltage terminal and an output terminal, the current input terminal of each output current controlling module is respectively connected to an output terminal of each LED group of the LED groups in a one-to-one manner, an output terminal of each output current controlling module is connected to a first terminal of the resistor Re, a second terminal of the resistor Re is connected to the ground, when the input voltage of the LED strip reaches the sum of a forward conduction voltage of one LED group and all forward conduction voltages of LED groups connected before the one LED group, the output current controlling module connected to the one LED group is correspondingly connected;

the reference voltage generating module comprises a plurality of output terminals, the number of the plurality of output terminals is equal to the number of the plurality of output current controlling modules, the plurality of output terminals are respectively connected to the reference voltage terminal of each output current controlling module in a one-to-one manner, the reference voltage generating module provides a reference voltage to each of the output current controlling modules, the reference voltage and the resistor Re jointly determine the output current of each output current controlling module.

Another object of the invention is to provide an LED lighting device. The LED lighting device comprises a rectifier bridge, an LED strip and an LED controlling circuit with high power factor connected with a LED strip which comprises a plurality of LED groups connected in series of which each comprises a number of LEDs connected in series, in parallel or in series-parallel. The LED controlling circuit comprises:

a plurality of output current controlling modules, a resistor Re and a reference voltage generating module;

the number of the plurality of output current controlling modules is equal to the number of the plurality of LED groups, each of the output current controlling modules comprises a current input terminal, a reference voltage terminal and an output terminal, the current input terminal of each output current controlling module is respectively connected to an output terminal of each LED group of the LED groups in a one-to-one manner, an output terminal of each output current controlling module is connected to a first terminal of the resistor Re, a second terminal of the resistor Re is connected to the ground, when the input voltage of the LED strip reaches the sum of a forward conduction voltage of one LED group and all forward conduction voltages of LED groups connected before the one LED group, the output current controlling module connected to the one LED group is correspondingly connected;

the reference voltage generating module comprises a plurality of output terminals, the number of the plurality of output terminals is equal to the number of the plurality of output current controlling modules, the plurality of output terminals are respectively connected to the reference voltage terminal of each output current controlling module in a one-to-one manner, the reference voltage generating module provides a reference voltage to each of the output current controlling modules, the reference voltage and the resistor Re jointly determine the output current of each output current controlling module.

In the present invention, by using an LED controlling circuit with high power factor comprising a plurality of output current controlling module, the resistor Re and the reference voltage generating module, the LED groups is driven accordingly in a piecewise manner to be on and a current flows through the LED groups according to the input voltage of the LED strip, without sampling the input voltage of the LED strip by a sampling circuit and without increasing the number of high cost component, which increase the power factor of the whole LED controlling circuit and the efficiency of the system, thereby solving the problem of low power factor and low efficiency system existing in the prior art.

DETAILED DESCRIPTION OF THE PREFERRED EMBODIMENTS

To make the objectives, technical solutions and advantages of the present invention clearer, the present invention will be further described hereafter with reference to the accompany drawings and embodiments. It shall be understood that, the embodiments described herein are only intended to illustrate but not to limit the present invention.

In the embodiment of the present invention, by using an LED controlling circuit with high power factor comprising a plurality of output current controlling module, a resistor Re and a reference voltage generating module, the LED groups is driven accordingly in a piecewise manner to be on and a current flows through the LED groups according to the input voltage of the LED strip, without sampling the input voltage of the LED strip by a sampling circuit and without increasing the number of high cost component, which increase the power factor of the whole LED controlling circuit and the efficiency of the system.

Figure 3:
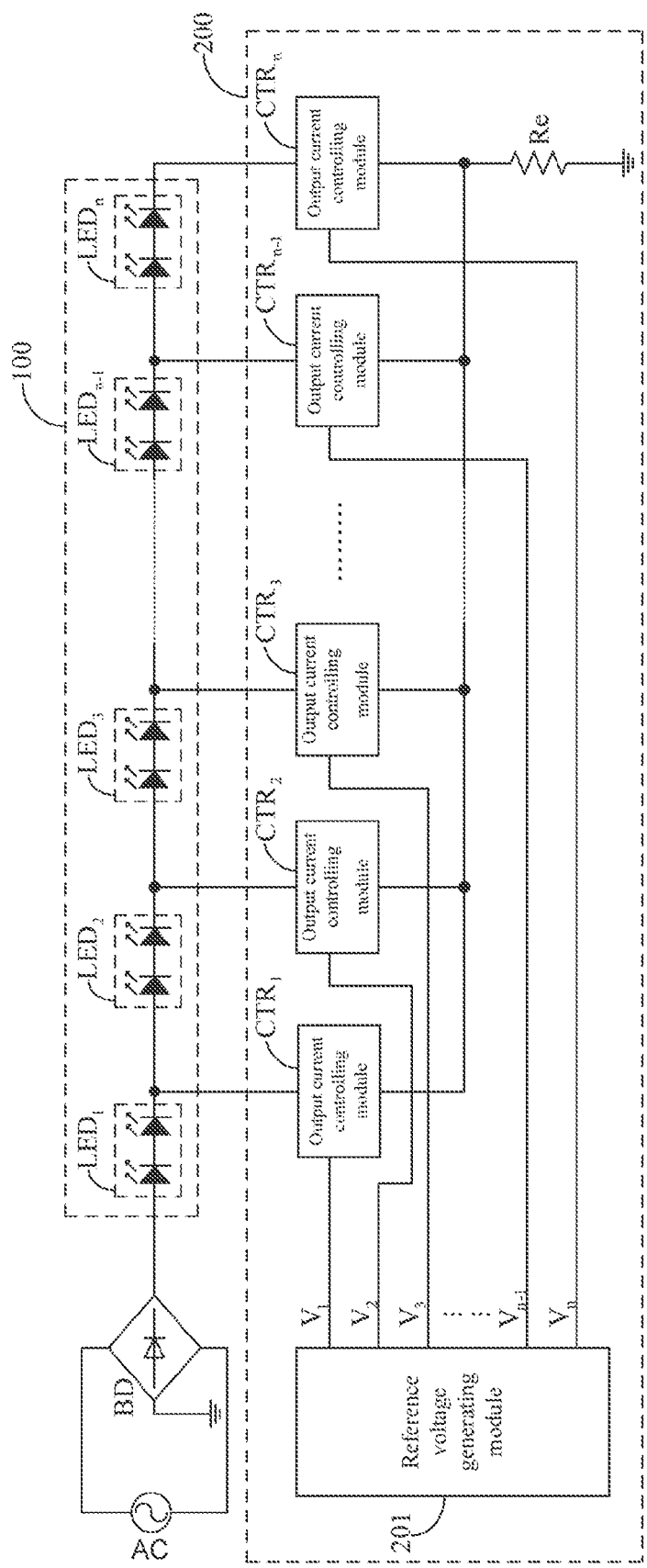
FIG. 3 is a module structure diagram of an LED controlling circuit with high power factor in the embodiment of the present invention.

In the embodiment of the present invention, as shown in FIG. 3, an input terminal and an output terminal of the LED strip 100 are respectively connected to the output terminal of the rectifier bridge BD and the LED controlling circuit 200 with high power factor, the rectifier bridge BD rectifies the alternative current.

In FIG. 3, the LED controlling circuit 200 is connected with a LED strip 100 comprising a plurality of LEDs. The LED strip 100 is formed by connecting a plurality of LED groups in series of which each comprises a number of LEDs connected in series, in parallel or in series-parallel. The number of the LEDs in each LED group may be equal or not equal.

The LED controlling circuit 200 comprises:

A plurality of output current controlling modules ($CTR_1$ to $CTR_n$), a resistor Re and a reference voltage generating module 201.

The number of the plurality of output current controlling modules ($CTR_1$ to $CTR_n$) is equal to the number of the plurality of LED groups in the LED strip 100, each of the output current controlling modules ($CTR_1$ to $CTR_n$) comprises a current input terminal, a reference voltage terminal and an output terminal, the current input terminal of each output current controlling module is respectively connected to an output terminal of each LED group of the LED groups in a one-to-one manner, an output terminal of each output current controlling module is connected to a first terminal of the resistor Re, a second terminal of the resistor Re is connected to the ground, when the input voltage of the LED strip reaches the sum of a forward conduction voltage of one LED group ($LED_n$) and all forward conduction voltages of LED groups connected before the one LED group ($LED_1$, $LED_2$, ..., $LED_{n-1}$), the output current controlling module connected to the one LED group ($LED_n$) is correspondingly on.

The reference voltage generating module 201 comprises a plurality of output terminals, the number of the plurality of output terminals is equal to the number of the plurality of output current controlling modules, the plurality of output terminals are respectively connected to the reference voltage terminal of each output current controlling module in a one-to-one manner, the reference voltage generating module 201 provides a reference voltage to each of the output current controlling modules, the reference voltage and the resistor Re jointly determine the output current of each output current controlling module, the output current is the conduction current of the LED group when the LED group is on corresponding to the output current controlling module.

Wherein the reference voltage generating module 201 can generate more than one direct current with different voltage by using a typical bandgap reference circuit, because its structure is relatively common, it's not described further here.

In FIG. 3, the LED strip is divided in to n LED groups (N is a positive integer), LED group $LED_1$ to $LED_n$, each LED group comprises two LEDs (here only taking the quantity of the LED being 2 as an example, is not used to limit the number of the LEDs in the LED strip), and the number of the plurality of output current controlling modules is accordingly n, that is the plurality of output current controlling modules comprises the output current controlling modules $CTR_1$ to $CTR_n$, the reference voltage generating module 101 has n output terminals $V_1$ to $V_n$, the respective reference voltage terminal of the output current controlling modules $CTR_1$ to $CTR_n$ is respectively connected to the output terminals $V_1$ to $V_n$ of the reference voltage generating module 101 in a one-to-one manner, and the reference voltages output at the output terminals $V_1$ to $V_n$ are $U_1$ to $U_n$, $U_1 < U_2 < U_3 < ... < U_n$.

Furthermore, because the structure of each of the output current controlling modules ($CTR_1$ to $CTR_n$) is identical, the output current controlling module $CTR_1$ is taken as an example to illustrate the internal structure of the output current controlling module in conjunction with FIG. 3:

the LED controlling circuit $CTR_1$ comprises an operational amplifier $OP_1$ and an NMOS transistor $M_1$, a non-inverting input terminal of the operational amplifier $OP_1$ is the reference voltage terminal of the output current controlling module $CTR_1$, a drain of the NMOS transistor $M_1$ is the current input terminal of the output current controlling module $CTR_1$, a gate of the NMOS transistor is connected to an output terminal of the operational amplifier $OP_1$, a substrate of the NMOS transistor is connected to the a source of the NMOS transistor $M_1$, the source of the NMOS transistor $M_1$ and an inverting input terminal of the operational amplifier $OP_1$ are connected together to form the output terminal of the output current controlling module $CTR_1$.

Figure 4:
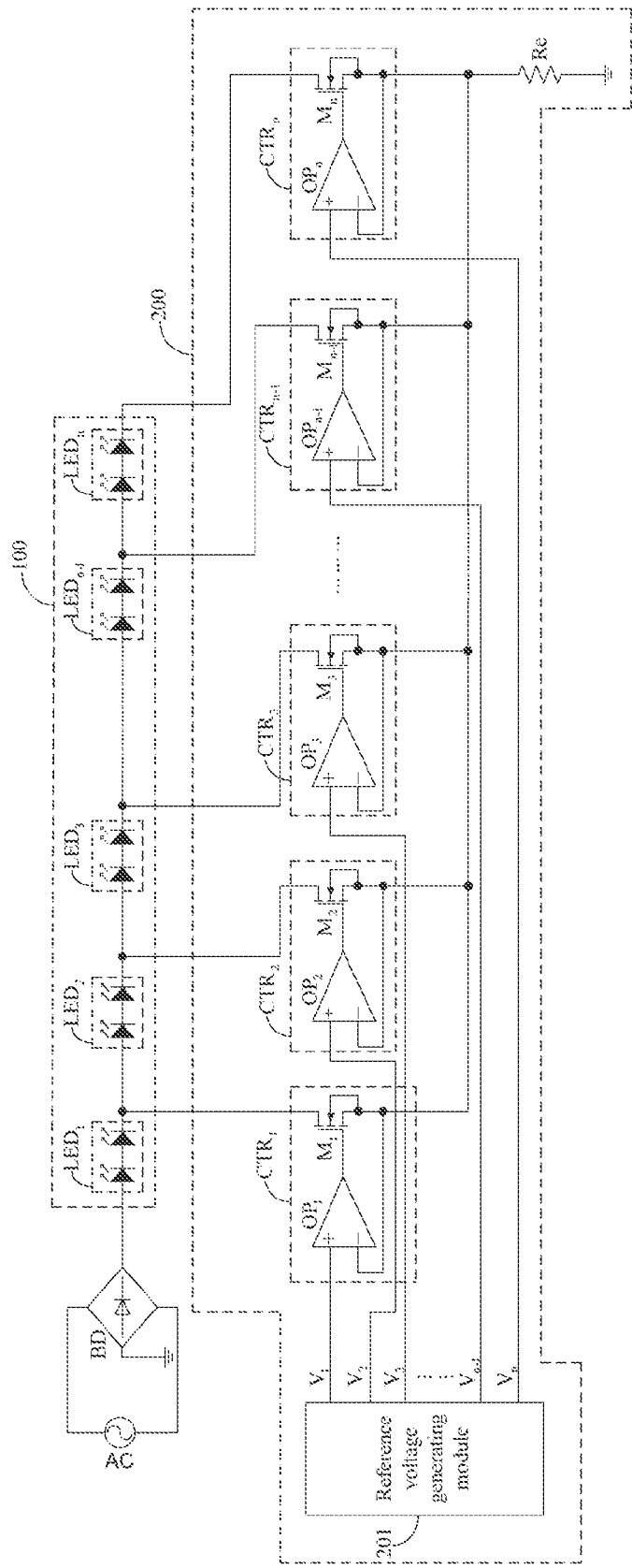
FIG. 4 is a structure diagram of an example circuit of an LED controlling circuit with high power factor in the embodiment of the present invention.

As shown in FIG. 4, the output current controlling module $CTR_2$ comprises the operational amplifier $OP_2$ and the NMOS transistor $M_2$, the connection relationship between the operational amplifier $OP_2$ and the NMOS transistor $M_2$ is the same as connection relationship between the operational amplifier $OP_1$ and the NMOS transistor $M_1$, and so on, the output current controlling module $CTR_n$ comprises the operational amplifier $OP_n$ and the NMOS transistor $M_n$, the connection relationship between the operational amplifier $OP_n$ and the NMOS transistor $M_n$ is the same as connection relationship between the operational amplifier $OP_1$ and the NMOS transistor $M_1$, thus it's not described further here.

The LED controlling circuit 200 is described further hereafter in conjunction with the work principle:

When the rectifier bridge BD is connected to the alternating current (ac), the input voltage of the LED strip 100 is half sin wave. Assuming that the input voltage increases from 0 V, when the input voltage reaches to the forward conduction voltage of the LED group $LED_1$, because the reference voltage $U_1$ at the non-inverting terminal of the operational amplifier $OP_1$ is greater than the voltage at inverting terminal of the operational amplifier $OP_1$ (when the $LED_1$ is off, the voltage at inverting terminal of the operational amplifier $OP_1$ is 0V), the output terminal of the operational amplifier $OP_1$ outputs a high level to drive the NMOS transistor $M_1$ to be on. At that time all the LEDs in the LED group $LED_1$ are on and the current flows through the LEDs, the voltage at the source of the NMOS transistor $M_1$ increases with the increase of the conduction current of the LED group $LED_1$. When the voltage at the source of the NMOS transistor $M_1$ is equal to the reference voltage $U_1$, the operational amplifier $OP_1$ has a balanced and stable output, the voltage at the first terminal of the resistor Re is $U_1$, thus the formula of the conduction current $I_1$ of the LED group $LED_1$ is:

$$I_1 = U_1/Re.$$

The input voltage of the LED strip 100 continuously increases, when the input voltage reaches the sum of the forward conduction voltages of the LED groups $LED_1$ and $LED_2$, because the reference voltage $U_2$ at the non-inverting terminal of the operational amplifier $OP_2$ is greater than the voltage $U_1$ at the inverting terminal of the operational amplifier (the inverting terminal of the operational amplifier $OP_2$ is connected to the source of the NMOS transistor $M_1$, the voltage is $U_1$), the output terminal of the operational amplifier $OP_2$ outputs a high level to drive NMOS transistor $M_2$ to be on, and all the LEDs in the LED groups $LED_1$ and $LED_2$ are on and the current flows through the LEDs. And the voltage at the source of the NMOS transistor $M_2$ is U2, that is the voltage at the inverting terminal of the operational amplifier $OP_1$ changes from $U_1$ to $U_2$, then the voltage $U_2$ at the inverting terminal of the operational amplifier $OP_1$ is larger than the voltage $U_1$ at the non-inverting terminal of the operational amplifier, such that the operational amplifier $OP_1$ outputs a low level, the low level cuts off the NMOS transistor $M_1$. The conduction currents of the LED groups $LED_1$ and $LED_2$ is controlled by the output current controlling module $CTR_2$, the conduction current of the LED groups $LED_1$ and $LED_2$ controlled by the output current controlling module $CTR_1$ is then controlled by the output current controlling module $CTR_2$. Meanwhile, the voltage at the first terminal of the resistor Re increases to $U_2$. Therefore, the conduction current $I_2$ of the LED groups $LED_1$ and $LED_2$ is:

$$I_2 = U_2/Re.$$

By such analogy, with the continuously increase of the input voltage of the LED strip, the output current controlling modules $CTR_3$ to $CTR_n$ continue to push forward according to the above work process, and achieve driving the LED groups in a piecewise manner to be on, without sampling the input voltage of the LED strip by a sampling circuit, such that the output current controlling modules drive more LED groups to be on in a piecewise manner and the current flow through the LED groups during the continuous increasing of the input voltage, until all the LED groups $LED_1$ to $LED_n$ in the LED strip 100 are on and the current flow through the LED groups simultaneously, at that time, the conduction current $I_n$ of all LED groups is:

$$I_n = U_n/Re.$$

With the increase of the input voltage, and because $U_1 < U_2 < U_3 < \ldots < U_n$, $I_1 < I_2 < I_3 < \ldots I_n$, such that the conduction current of the LED group can change synchronously with the input voltage. When the input voltage increase gradually, the current flowing through the LED group (i.e., the output current of the rectifier bridge BD) also gradually increases, when the input voltage reduces gradually, the current flowing through the LED group also gradually reduces.

Figure 5:
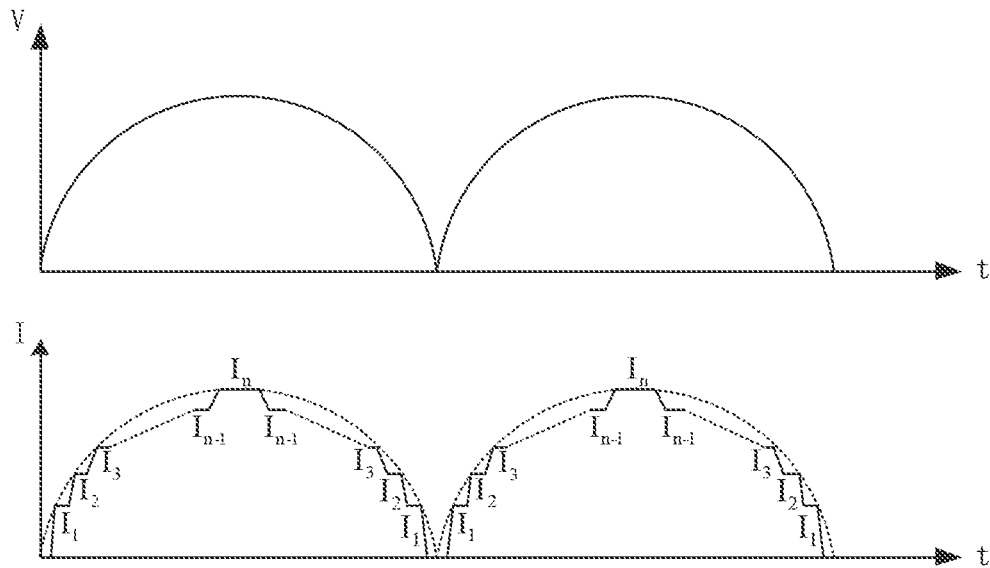
FIG. 5 is the waveform of the output voltage and output current of the rectifier bridge BD in the embodiment of the present invention.

FIG. 5 shows the waveform of the output voltage V and output current I of the rectifier bridge BD in the embodiment of the present invention. From the waveform we can know that the in-phase output of the output voltage and output current of the rectifier bridge BD is realized, thereby improving the power factor. And even the output voltage of the rectifier bridge BD changes, there will be always a current flowing through the LED group, therefore the efficiency of the system is improved.

Figure 6:
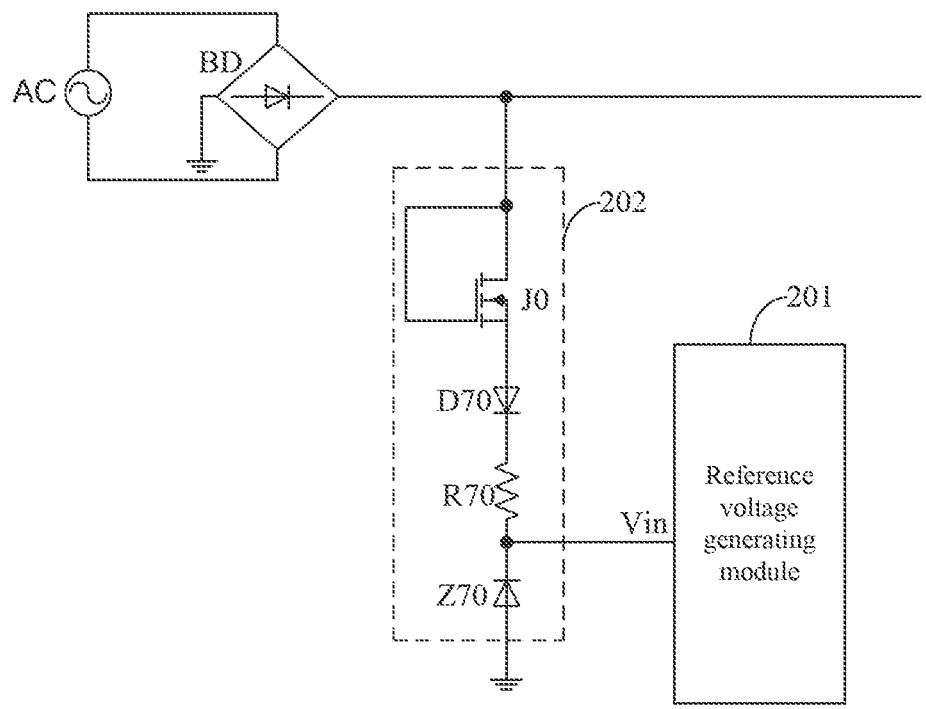
FIG. 6 is a structure diagram of an example circuit of a power supply controlling circuit of an LED controlling circuit with high power factor in the embodiment of the present invention.

FIG. 6 shows a structure diagram of an example circuit of a power supply controlling circuit 202 of an LED controlling circuit with high power factor in the embodiment of the present invention. The power supply controlling circuit 202 comprises a J-type field effect transistor J0 (J0 may be also replaced with a depletion mode MOS transistor), a diode D70, a resistor R70 and a Zener diode Z70; the drain and the gate of the J-type field effect transistor J0 are connected to the output terminal of the rectifier bridge BD, the source of J-type field effect transistor J0 is connected to the anode of the diode D70, the resistor R70 is connected between the cathode of the diode D70 and the cathode of the Zener diode Z70, and the cathode of the Zener diode Z70 cathode is connected to the power supply input terminal Vin of the reference voltage generating module 201 (also connected with the power supply input terminal of the operational amplifier of each output current controlling module), the anode of the Zener diode Z70 is connected to the ground. The above power supply controlling circuit provides power to the LED controlling circuit 200 through the J-type field effect transistor J0.

The provided circuit structure of the above power supply controlling circuit 202 in the embodiment of the present invention is intended to describe the configuration of the LED controlling circuit 200 in more detail, this is just one exemplary circuit structure of the power supply control circuit, and is not used to limit the structure of the power supply control circuit.

Figure 7:
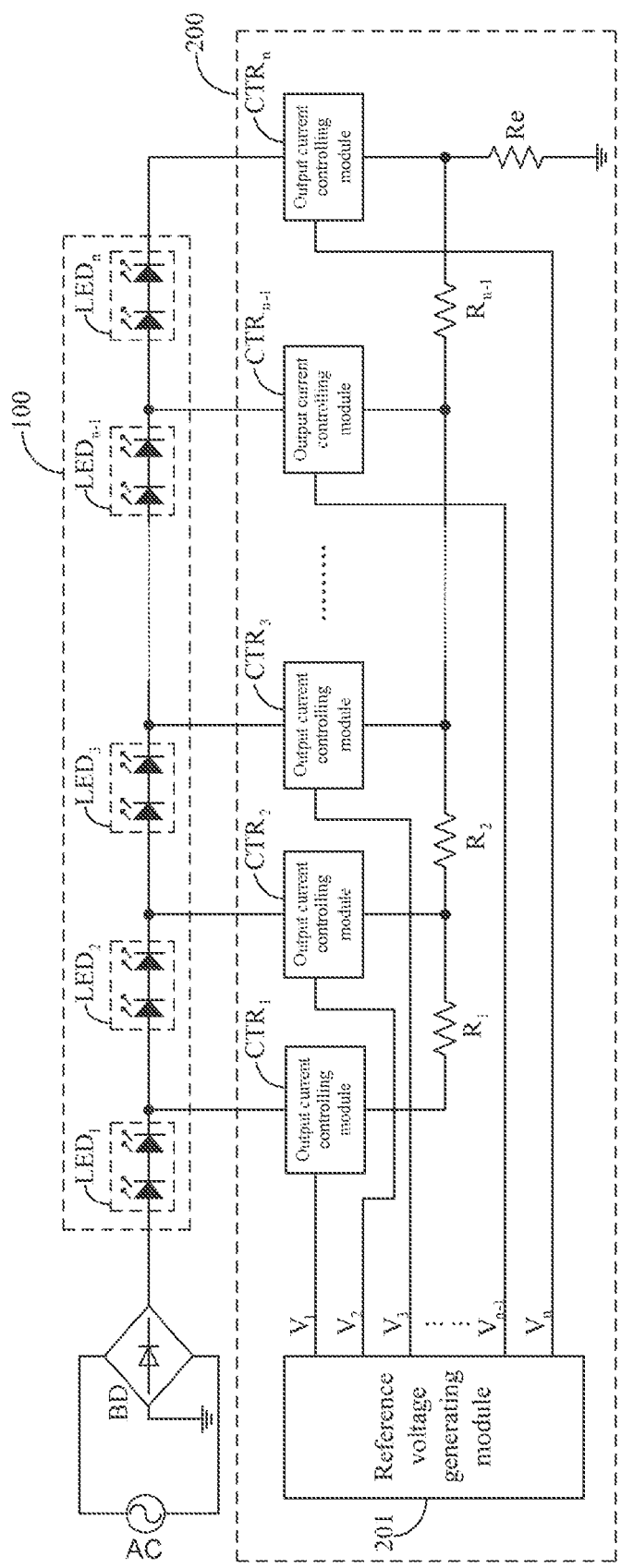
FIG. 7 is a module structure diagram of an LED controlling circuit with high power factor in another the embodiment of the present invention.

In another embodiment of the present invention, as shown in FIG. 7, LED controlling circuit 200 comprises a plurality of output current controlling modules, the resistor Re and the reference voltage generating module 201, as well as comprises a plurality of resistors $R_1$ to $R_{n-1}$, each of the plurality of resistors $R_1$ to $R_{n-1}$ is connected between the output terminals of very two adjacent output current controlling modules of the output current controlling modules $CTR_1$ to $CTR_n$, the difference between the plurality of the resistors $R_1$ to $R_{n-1}$ and the number of the output current controlling module is 1. Wherein, the resistor $R_1$ is connected between the output current controlling module $CTR_1$ and the output current controlling module $CTR_2$, the resistor $R_2$ is connected between the output current controlling module $CTR_2$ and the output current controlling module $CTR_3$, by such analogy, the resistor $R_{n-1}$ is connected between the output current controlling module $CTR_{n-1}$ and the output current controlling module $CTR_n$.

Figure 1:
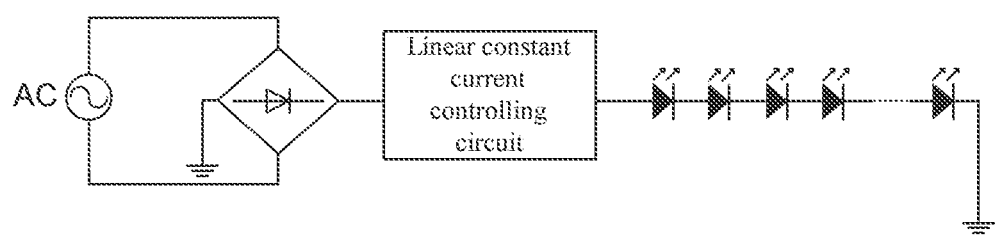
FIG. 1 is a schematic diagram of a traditional LED constant current controlling circuit.
Figure 2:
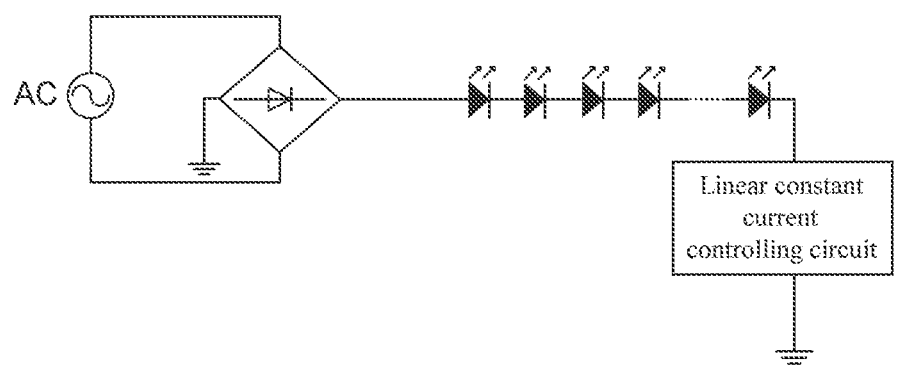
FIG. 2 is a schematic diagram of a traditional LED constant current controlling circuit.

The another embodiment of the present invention shown in FIG. 7 further comprises a plurality of resistors $R_1$ to $R_{n-1}$, aims at adjusting the conduction current of the one or more LED groups driven to light in the LED strip more flexibly, based on the LED controlling circuit 200 with high power factor shown in FIG. 2. Because it is for the adjustment of the current of the LED group, the resistance of the plurality of the resistors $R_1$ to $R_{n-1}$ is relatively small.

Figure 8:
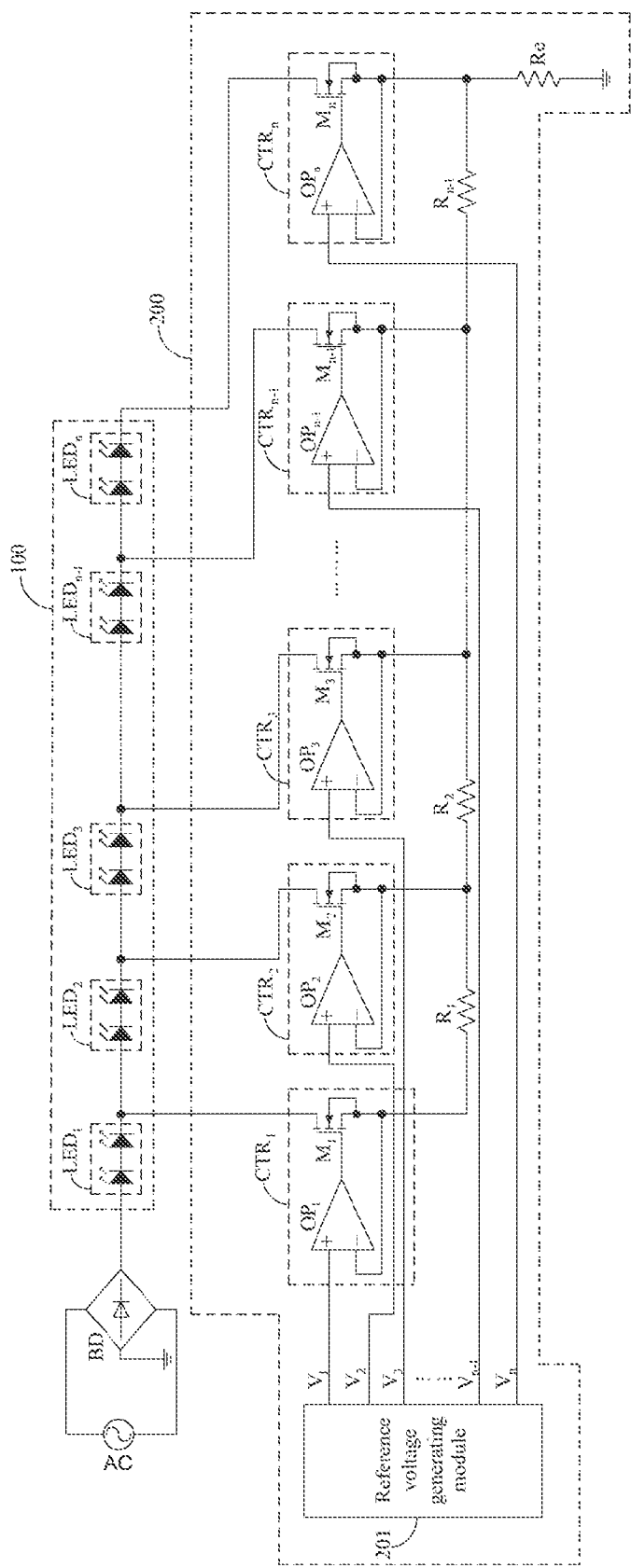
FIG. 8 is a structure diagram of an example circuit of an LED controlling circuit with high power factor in another embodiment of the present invention.

FIG. 8 shows a structure diagram of an example circuit of an LED controlling circuit 200 with high power factor in another embodiment of the present invention. The internal structure of the output current controlling modules $CTR_1$ to $CTR_n$ is the same as the structure shown in FIG. 4, therefore it's not described further here.

The LED controlling circuit 200 with high power factor shown in FIG. 8 is described further hereafter in conjunction with the work principle:

When the rectifier bridge BD is connected to the alternating current (ac), the input voltage of the LED strip is half sin wave. Assuming that the input voltage increases from 0 V, when the input voltage reaches to the forward conduction voltage of the LED group $LED_1$, because the reference voltage $U_1$ at the non-inverting terminal of the operational amplifier $OP_1$ is greater than the voltage at inverting terminal of the operational amplifier (when the $LED_1$ is off, the voltage at inverting terminal of the operational amplifier $OP_1$ is 0V), the output terminal of the operational amplifier $OP_1$ outputs a high level to drive NMOS transistor $M_1$ to be on. At that time all the LEDs in the LED group $LED_1$ are on and the current flow through the LEDs, the voltage at the source of the NMOS transistor $M_1$ increases with the increase of the conduction current of the LED group $LED_1$. When the voltage at the source of the NMOS transistor $M_1$ is equal to the reference voltage $U_1$, the operational amplifier $OP_1$ has a balanced and stable output, the voltage at the first terminal of the resistor R1 is $U_1$, and thus the formula of the conduction current $I_1$ of the LED group $LED_1$ is:

$$I_1 = U_1/(R_{1+}R_{2+}\ldots+R_{n-1+Re)}.$$

The input voltage of the LED strip 100 continuously increases, when the input voltage reaches the sum of the forward conduction voltages of the LED groups $LED_1$ and $LED_2$, because the reference voltage $U_2$ at the non-inverting terminal of the operational amplifier $OP_2$ is greater than the voltage $U_1$ at the inverting terminal of the operational amplifier (the inverting terminal of the operational amplifier $OP_2$ is connected to the source of the NMOS transistor $M_1$, because the reference of the resistor R1 is small, at that time the voltage at the inverting terminal of the operational amplifier $OP_2$ is still regarded as $U_1$), the output terminal of the operational amplifier $OP_2$ outputs a high level to drive the NMOS transistor $M_2$ to be on, and all the LEDs in the LED groups $LED_1$ and $LED_2$ are on and the current flows through the LEDs. And the voltage at the source of the NMOS transistor $M_2$ is $U_2$, that is the voltage at the inverting terminal of the operational amplifier $OP_1$ changes from $U_1$ to $U_2$, then the voltage $U_2$ at the inverting terminal of the operational amplifier $OP_1$ is larger than the voltage $U_1$ at the non-inverting terminal of the operational amplifier, such that the operational amplifier $OP_1$ outputs a low level, which cuts off the NMOS transistor $M_1$. The conduction currents of the LED groups $LED_1$ and $LED_2$ is controlled by the output current controlling module $CTR_2$, the conduction current of the LED groups $LED_1$ and $LED_2$ controlled by the output current controlling module $CTR_1$ is then controlled by the output current controlling module $CTR_2$. Meanwhile, the voltage at the first terminal of the resistor Re increases to $U_2$. Therefore, the conduction current $I_2$ of the LED groups $LED_1$ and $LED_2$ is:

$$I_2 = U_2/(R_{2+}R_{3+}\ldots+R_{n-1+Re})$$

By such analogy, with the continuously increase of the input voltage of the LED strip, the output current controlling modules $CTR_3$ to $CTR_n$ continue to push forward according to the above work process, and achieve driving the LED groups in a piecewise manner to be on, without sampling the input voltage of the LED strip by a sampling circuit, such that the output current controlling modules drive more LED groups to be on in a piecewise manner and the current flow through the LED groups during the continuous increasing of the input voltage, until all the LED groups $LED_1$ to $LED_n$ in the LED strip 100 are on and the current flow through the LED groups simultaneously, at that time, the conduction current $I_n$ of all LED groups is:

$$I_n = U_n/Re.$$

With the increase of the input voltage, the conduction current of the LED group to be driven is adjusted through the resistors $R_1$ to $R_{n-1}$ and the resistor Re, such that the conduction current of the LED group can change synchronously with the input voltage, which improve the power factor and the system efficiency.

Another object of the embodiment of the present invention is to provide a LED lighting device, which comprises a rectifier bridge, an LED strip 100 and an LED controlling circuit 200 with high power factor.

In the embodiment of the present invention, by using an LED controlling circuit 200 with high power factor comprising a plurality of output current controlling modules, the resistor Re and the reference voltage generating module 201, the LED groups is driven accordingly in a piecewise manner to be on and a current flows through the LED groups according to the input voltage of the LED strip 100, without sampling the input voltage of the LED strip by a sampling circuit and without increasing the number of high cost component, which increase the power factor of the whole LED controlling circuit 200 and the efficiency of the system, thereby solving the problem of low power factor and low efficiency system existing in the prior art.

What described above are only preferred embodiments of the present disclosure but are not intended to limit the scope of the present disclosure, any modifications, equivalent replacements and improvements etc. made within the spirit and principle of the present invention, should be included in the protection scope of the present invention.

What is claimed is:

1. An LED controlling circuit with high power factor, connected with a LED strip which comprises a plurality of LED groups connected in series of which each comprises a number of LEDs connected in series, in parallel or in series-parallel, characterized in that, the LED controlling circuit comprises:

a plurality of output current controlling modules, a resistor Re and a reference voltage generating module;

the number of the plurality of output current controlling modules is equal to the number of the plurality of LED groups, each of the output current controlling modules comprises a current input terminal, a reference voltage terminal and an output terminal, the current input terminal of each output current controlling module is respectively connected to an output terminal of each LED group of the LED groups in a one-to-one manner, an output terminal of each output current controlling module is connected to a first terminal of the resistor Re, a second terminal of the resistor Re is connected to the ground, when the input voltage of the LED strip reaches the sum of a forward conduction voltage of one LED group and all forward conduction voltages of LED groups connected before the one LED group, the output current controlling module connected to the one LED group is correspondingly connected;

the reference voltage generating module comprises a plurality of output terminals, the number of the plurality of output terminals is equal to the number of the plurality of output current controlling modules, the plurality of output terminals are respectively connected to the reference voltage terminal of each output current controlling module in a one-to-one manner, the reference voltage generating module provides a reference voltage to each of the output current controlling modules, the reference voltage and the resistor Re jointly determine the output current of each output current controlling module.

2. The LED controlling circuit of claim 1, characterized in that, the LED controlling circuit further comprises a plurality of resistors, each of the resistors is connected between the output terminals of very two adjacent output current controlling modules of the output current controlling modules, the difference between the number of the resistors and the number of the output current controlling module is 1.

3. The LED controlling circuit of claim 1, characterized in that, the output current controlling module comprises an operational amplifier and an NMOS transistor, a non-inverting input terminal of the operational amplifier is the reference voltage terminal of the output current controlling module, a drain of the NMOS transistor is the current input terminal of the output current controlling module, a gate of the NMOS transistor is connected to an output terminal of the operational amplifier, a substrate of the NMOS transistor is connected the a source of the NMOS transistor, the source of the NMOS transistor and an inverting input terminal are connected together to form the output terminal of the output current controlling module.

4. An LED lighting device, characterized in that, the LED lighting device comprises a rectifier bridge, an LED strip and an LED controlling circuit with high power factor connected with a LED strip which comprises a plurality of LED groups connected in series of which each comprises a number of LEDs connected in series, in parallel or in series-parallel, characterized in that, the LED controlling circuit comprises:

a plurality of output current controlling modules, a resistor Re and a reference voltage generating module;

the number of the plurality of output current controlling modules is equal to the number of the plurality of LED groups, each of the output current controlling modules comprises a current input terminal, a reference voltage terminal and an output terminal, the current input terminal of each output current controlling module is respectively connected to an output terminal of each LED group of the LED groups in a one-to-one manner, an output terminal of each output current controlling module is connected to a first terminal of the resistor Re, a second terminal of the resistor Re is connected to the ground, when the input voltage of the LED strip reaches the sum of a forward conduction voltage of one LED group and all forward conduction voltages of LED groups connected before the one LED group, the output current controlling module connected to the one LED group is correspondingly connected;

the reference voltage generating module comprises a plurality of output terminals, the number of the plurality of output terminals is equal to the number of the plurality of output current controlling modules, the plurality of output terminals are respectively connected to the reference voltage terminal of each output current controlling module in a one-to-one manner, the reference voltage generating module provides a reference voltage to each of the output current controlling modules, the reference voltage and the resistor Re jointly determine the output current of each output current controlling module.

5. The LED controlling circuit of claim 4, characterized in that, the LED controlling circuit further comprises a plurality of resistors, each of the resistors is connected between the output terminals of very two adjacent output current controlling modules of the output current controlling modules, the difference between the number of the resistors and the number of the output current controlling module is 1.

6. The LED controlling circuit of claim 4, characterized in that, the output current controlling module comprises an operational amplifier and an NMOS transistor, a non-inverting input terminal of the operational amplifier is the reference voltage terminal of the output current controlling module, a drain of the NMOS transistor is the current input terminal of the output current controlling module, a gate of the NMOS transistor is connected to an output terminal of the operational amplifier, a substrate of the NMOS transistor is connected the a source of the NMOS transistor, the source of the NMOS transistor and an inverting input terminal are connected together to form the output terminal of the output current controlling module.

* * * * *